Patented Nov. 21, 1950

2,530,512

UNITED STATES PATENT OFFICE 2,530,512

OXIDATION OF ALIPHATIC ESTERS

James Gordon Napier Drewitt, Spondon, near Derby, England, assignor to Celanese Corporation of America, a corporation of Delaware No Drawing. Application June 8, 1948, Serial No. 31,837. In Great Britain June 13, 1947

4 Claims. (Cl. 260—541)

This invention relates to the manufacture of organic compounds, and is more particularly concerned with the manufacture of acetic acid.

According to the present invention, it has been found possible to cause ethyl acetate to undergo oxidation so as to yield acetyl values beyond that represented by the acetic acid combined in the molecule; more particularly, it has been found possible to oxidise ethyl acetate so as to produce acetic acid from both the ethyl and the acetyl radicles of the ester.

This new reaction is quite surprising since, although a variety of organic compounds can be oxidised to acetic acid, ethyl acetate, except where conditions are such as to result in complete combustion, has always been regarded as very resistant to oxidation. The process of the invention is especially important in that it provides a new route to acetic acid, starting with ethylene. Thus ethylene may be transformed into ethyl acetate by reaction with acetic acid in the presence of a catalyst such as boron trifluoride or sulphuric acid, or may be absorbed in an acid such as strong sulphuric acid and the absorption product reacted with acetic acid, and the ethyl acetate thus produced oxidised so as to produce acetic acid, part of which can be returned to the process for reaction with further ethylene while the remainder represents the over-all transformation of ethylene into acetic acid. In this way the cost of producing acetic acid from ethylene may be substantially reduced.

The oxidation of ethyl acetate to acetic acid can best be carried out with oxygen under very high superatmospheric pressure. Although air can be used, its use reduces the partial pressure of oxygen present and thus reduced somewhat the output with plant of a given size. In general pressures of the order of 100–500 pounds per square inch can be employed, and the process can be operated very conveniently as a batch process by pumping oxygen into an autoclave containing ethyl acetate, closing the autoclave and raising the temperature until reaction ensues.

The temperature at which the reaction can be initiated varies somewhat according to the catalyst used. In practice cobalt naphthenate has been found to catalyse the reaction quite efficiently even when used in small quantity, for example a quantity equal to about 1% of the weight of the ethyl acetate used. A smaller quantity of catalyst can be used although in this case the yield of acetic acid is sometimes somewhat lower. In general the quantity of catalyst in the case of cobalt naphthenate may be between 0.1 and 5% of the weight of the ethyl acetate although it is preferred to use not less than 0.5% by weight. With this catalyst and using an initial oxygen pressure of between 150 and 250 pounds per square inch, it has been found best to raise the temperature of the catalyst-containing ethyl acetate to about 150–200° C. and to maintain the reactants at this temperature until reaction ensues. There is usually a period during which reaction does not appear to have commenced and this period may vary between ten minutes and half an hour, during which time the pressure, which is of course substantially higher than that to which the reaction vessel was charged initially, remains constant or falls slowly while the temperature remains steady. After this induction period the temperature begins to rise first slowly and then rapidly, and simultaneously the pressure falls. When commencement of reaction is thus indicated, the heat input should be cut off from the reaction vessel and the reaction allowed to proceed without either heating or cooling. When reaction has apparently ceased the reaction vessel is cooled and opened, residual oxygen and other gases present being vented, preferably through suitable condensers, and the products worked up for the recovery of acetic acid. It is desirable that during the reaction the contents of the reaction vessel should be kept in a state of agitation, for example a shaken autoclave is the most convenient form of reaction vessel.

Instead of cobalt naphthenate there may be employed as catalyst other cobalt salts which may be dissolved or suspended in the ethyl acetate, for example cobalt acetate or cobalt stearate and likewise other oxidising catalysts, especially metals salts useful as oxidation catalysts, e. g. salts of manganese such as manganese acetate. Mixtures of catalytic substances, for example a mixture of the acetates or naphthenates of cobalt and manganese, cobalt and copper or cobalt and silver may be used if desired. With some catalysts a higher temperature is needed to initiate the reaction than with others. For instance, when using a mixture of 25% cobalt acetate and 75% manganese acetate a temperature of about 250° C. has been found suitable. In general it is possible to initiate the reaction at a temperature between 125 and 300° C.

In addition to the ethyl acetate and catalyst the reaction vessel may contain other substances, whether or not they are inert or undergo reaction simultaneously with the ethyl acetate. For example acetaldehyde may be added to the ethyl acetate and will, simultaneously with the ethyl acetate, undergo oxidation to acetic acid. Acetic acid and acetic anhydride appear to act merely as inert diluents. Some esters may also be used as diluents, for example it has been found possible to subject ethyl benzoate to reaction conditions similar to those which may be employed for oxidising ethyl acetate to acetic acid without appreciable effect upon the ethyl benzoate. It is generally undesirable that water should be present in the reaction since it appears to lengthen considerably the induction period during which reaction does not appear to take place, and also to result in a lower eventual yield of acetic acid. Thus, quite a small percentage of water present, e. g. about 1% w./w. of water based on the ethyl acetate, results in an induction period of more than six hours at 145–150° C. with cobalt naphthenate as catalyst.

The ratio of ethyl acetate to oxygen may be varied within quite wide limits without apparently affecting the result in any substantial degree except that, where the quantity of oxygen is small in comparison with the quantity theoretically required to convert all ethyl acetate present into acetic acid, the conversion is much less than if the reverse is the case. On the other hand a large excess of oxygen is liable to lead to oxidation of a substantial part of the ethyl acetate to oxides of carbon and water. For this reason it is preferred to use not very much more than the theoretical quantity of oxygen while if desired even less than this may be used, for instance down to about one-half of that theoretically required, so as to ensure a high yield even at the expense of the conversion. Where a continuous method of operation is adopted, for example by pumping oxygen under pressure in countercurrent to a stream of ethyl acetate containing cobalt naphthenate or other catalysts, the rate of passage of oxygen and ethyl acetate may, in general, be adjusted so as to give a ratio of ethyl acetate to oxygen of from ½ to about 2 molecules of ethyl acetate to each molecule of oxygen, but the ratio may be outside these limits.

The invention has been described more particularly in connection with the manufacture of acetic acid from ethyl acetate, but it may be applied generally to the oxidation of acetic acid esters of alcohols containing 2 to 4 carbon atoms. For example, by oxidation of isopropyl acetate under the conditions described above acetic acid and acetone may be obtained while from sec. butyl acetate may be obtained acetic acid and methyl ethyl ketone. Here again the value of the invention as a means of transforming olefines into oxygen-containing compounds is apparent. However, the invention includes also the oxidation of normal propyl acetate for the production of propionic and acetic acids.

The following example illustrates the invention:

*Example*

An autoclave is charged with approximately ½₀ of its volume of ethyl acetate containing 1% of its weight of cobalt naphthenate, closed and oxygen pumped in to a pressure of 200 pounds per square inch. The oxygen supply is then cut off and the autoclave heated whilst being shaken to a temperature of 180–200° C. and maintained at this temperature for 2–4 hours, during which time the pressure rises to 400–430 pounds per square inch and then falls to a final pressure, after cooling to room temperature, of 75–100 pounds per square inch. The residual gases, consisting of unused oxygen together with oxides of carbon, are vented from the cold autoclave through an efficient condenser and the liquid products fractionated to separate acetic acid produced from unchanged ethyl acetate.

Under these conditions the ethyl acetate used up is converted into acetic acid with a yield of 80–90% of the theoretical as shown by the equation, $$CH_3.CO.O.CH_2.CH_3 + O_2 \rightarrow 2CH_3.CO.OH$$

Having described my invention, what I desire to secure by Letters Patent is:

1. Process for the manufacture of oxygen-containing organic compounds, which comprises heating together oxygen and a member of the group consisting of the acetic acid esters of ethyl, propyl and butyl alcohols to a temperature of at least 125° C. under a total pressure of at least 100 pounds per square inch until oxidation takes place to produce acetic acid and, as an oxidation product of the alkyl radicle of the ester, a compound of formula $R.CO.R'$, where R is a member of the group consisting of methyl and ethyl groups and $R'$ is a member of the group consisting of methyl and hydroxy groups.

2. Process for the manufacture of acetic acid, which comprises heating ethyl acetate to at least 125° C. together with oxygen under a pressure of at least 100 pounds per square inch and a metal salt oxidation catalyst until oxidation takes place to produce more than one molecular proportion of acetic acid for each molecular proportion of ethyl acetate taking part in the reaction.

3. Process for the manufacture of acetic acid, which comprises heating ethyl acetate with agitation to a temperature between 125° and 300° C. together with oxygen under a pressure of at least 100 pounds per square inch and cobalt naphthenate as catalyst until oxidation takes place to produce more than one molecular proportion of acetic acid for each molecular proportion of ethyl acetate taking part in the reaction.

4. Process for the manufacture of acetic acid, which comprises heating ethyl acetate with agitation to a temperature between 125° and 300° C. together with oxygen under a pressure of at least 100 pounds per square inch and 0.5 to 5% by weight of cobalt naphthenate based on the ethyl acetate used until oxidation takes place to produce more than one molecular proportion of acetic acid for each molecular proportion of ethyl acetate taking part in the reaction.

JAMES GORDON NAPIER DREWITT.

REFERENCES CITED

The following references are of record in the file of this patent:

UNITED STATES PATENTS

| Number | Name | Date |
| --- | --- | --- |
| 1,951,747 | Brezinski et al. | Mar. 20, 1934 |
| 1,982,160 | Guinot | Nov. 27, 1934 |
| 2,249,380 | Gerg | July 15, 1941 |
| 2,287,803 | Hull | June 30, 1942 |

OTHER REFERENCES

Wittig et al., Liebigs Ann., vol. 546, pages 172–179 (1941).